(12) United States Patent
Ishikawa et al.

(10) Patent No.: US 9,203,078 B2
(45) Date of Patent: Dec. 1, 2015

(54) NEGATIVE ELECTRODE FOR LITHIUM ION SECONDARY BATTERY, LITHIUM ION SECONDARY BATTERY, AND METHOD FOR PRODUCING NEGATIVE ELECTRODE FOR LITHIUM ION SECONDARY BATTERY

(71) Applicant: Tokyo Ohka Kogyo Co., Ltd., Kawasaki-shi (JP)

(72) Inventors: Kaoru Ishikawa, Kawasaki (JP); Takahiro Asai, Kawasaki (JP)

(73) Assignee: TOKYO OHKA KOGYO CO., LTD., Kawasaki Shi (JP)

( * ) Notice: Subject to any disclaimer, the term of this patent is extended or adjusted under 35 U.S.C. 154(b) by 116 days.

(21) Appl. No.: 13/853,757

(22) Filed: Mar. 29, 2013

(65) Prior Publication Data
US 2013/0295453 A1    Nov. 7, 2013

(30) Foreign Application Priority Data

Apr. 2, 2012    (JP) ................................. 2012-084107

(51) Int. Cl.
| | | |
|---|---|---|
| *H01M 4/134* | (2010.01) | |
| *H01M 4/1395* | (2010.01) | |
| *H01M 4/04* | (2006.01) | |
| *H01M 4/02* | (2006.01) | |
| *H01M 10/0525* | (2010.01) | |

(52) U.S. Cl.
CPC .............. *H01M 4/134* (2013.01); *H01M 4/043* (2013.01); *H01M 4/1395* (2013.01); *H01M 10/0525* (2013.01); *H01M 2004/025* (2013.01); *H01M 2220/30* (2013.01); *Y02E 60/122* (2013.01)

(58) Field of Classification Search
CPC ............................................... H01M 2004/025
USPC ............................................... 429/209, 218.1
See application file for complete search history.

(56) References Cited

U.S. PATENT DOCUMENTS

2005/0064291 A1 *    3/2005  Sato et al. ..................... 429/233

FOREIGN PATENT DOCUMENTS

| JP | 2008-251475 A | | 10/2008 |
|---|---|---|---|
| JP | 2009037895 | * | 2/2009 |
| JP | 2009-123379 A | | 6/2009 |
| JP | 2009-123380 A | | 6/2009 |

OTHER PUBLICATIONS

JP 2009037895—Translation.*
Partial Translation and Certificate of Partial Translation of Japanese Unexamined Patent Application, Publication No. 2009-037895 (BESSHO), published Feb. 19, 2009.

* cited by examiner

*Primary Examiner* — Ladan Mohaddes
(74) *Attorney, Agent, or Firm* — Knobbe Martens Olson & Bear LLP

(57) ABSTRACT

An object of the present invention is to provide a negative electrode for a lithium ion secondary battery, capable of obtaining a lithium ion secondary battery which is excellent in initial charge characteristics and is also excellent in charge/discharge cycle characteristics, and a method for producing the same, as well as a lithium ion secondary battery comprising the negative electrode for a lithium ion secondary battery. A negative electrode for a lithium ion secondary battery according to the present invention comprises a current collector layer, and a negative electrode active material layer composed of a tin structure, the tin structure includes a plurality of protrusions which protrude approximately perpendicularly to a main surface of the current collector layer, and a cross-sectional area of the tip portion parallel to the main surface of the current collector layer of the protrusion is smaller than that of the base end portion.

7 Claims, 3 Drawing Sheets

NEGATIVE ELECTRODE FOR LITHIUM ION SECONDARY BATTERY, LITHIUM ION SECONDARY BATTERY, AND METHOD FOR PRODUCING NEGATIVE ELECTRODE FOR LITHIUM ION SECONDARY BATTERY

This application is based on and claims the benefit of priority from Japanese Patent Application No. 2012-084107, filed on 2 Apr. 2012, the content of which is incorporated herein by reference.

BACKGROUND OF THE INVENTION

1. Field of the Invention

The present invention relates to a negative electrode for a lithium ion secondary battery, a lithium ion secondary battery, and a method for producing a negative electrode for a lithium ion secondary battery.

2. Related Art

In recent years, portable devices such as cellular phones, laptop computers and camera integrated VTRs form a large market. A lightweight and portable secondary battery having high energy density is strongly required as a power supply used in these portable devices. In particular, a lithium ion secondary battery has a comparative advantage in these required characteristics as compared with a secondary battery, and is progressively employed for portable devices. In the lithium ion secondary battery, upon discharging, lithium existing in a negative electrode is oxidized and lithium ions thus formed are released, while lithium ions existing in a positive electrode are reduced and a lithium compound thus formed is occluded. Upon charging, lithium ions in a negative electrode are reduced and lithium thus formed is occluded, while a lithium compound existing in a positive electrode is oxidized and lithium ions thus formed are released. As mentioned above, in the lithium ion secondary battery, upon charging/discharging, lithium ions move between the positive electrode and the negative electrode, and thus occluded as lithium or a lithium compound in any one of electrodes.

Electricity consumption of the portable device may increase more and more, and charge/discharge of the secondary battery is frequently repeated. In addition to required characteristics, an improvement in charge/discharge cycle characteristics, life extension and rapid charging are required to the lithium ion secondary battery, and thus an improvement in each member composing the lithium ion secondary battery is in progress.

A metallic material, which enables a large capacity by combining with lithium to form an alloy, has attracted attention as a negative electrode active material used in a lithium ion secondary battery. The metal, which combines with lithium to form an alloy, includes tin or an alloy containing tin, lead, silver and the like, and tin or a tin alloy is suited for practical use in view of material costs.

The present inventors propose, as a negative electrode base material which enables the production of a lithium ion secondary battery having high output voltage and high energy density, a negative electrode base material in which a tin film is formed on a patterned organic film (see Patent Documents 1 to 3). In these Patent Documents, the output voltage and the energy density are enhanced by increasing a surface area of the tin film. However, when the present inventors have evaluated charge/discharge cycle characteristics by lithium ion secondary batteries using the negative electrode base material of Patent Documents 1 to 3, it has been found that there is a problem. The problem is that alloying of lithium and tin, which occurs upon charging, is likely to occur concentratedly at the pillar-shaped tip portion and volume expansion involved in alloying becomes likely to occur at the tip portion, leading to the increased tip portion, and thus resulting in cracking at the root of a pillar. It has also been found that there is a problem that a tin film formed on a patterned organic film is peeled in the case of repeating charging/discharging.

Patent Document 1: Japanese Unexamined Patent Application, Publication No. 2009-123380
Patent Document 2: Japanese Unexamined Patent Application, Publication No. 2009-123379
Patent Document 3: Japanese Unexamined Patent Application, Publication No. 2008-251475

SUMMARY OF THE INVENTION

The present invention has been made in light of the above circumstances, and an object thereof is to provide a negative electrode for a lithium ion secondary battery, capable of obtaining a lithium ion secondary battery which has a large metal film surface area and which is excellent in initial charge characteristics and is also excellent in charge/discharge cycle characteristics; a method for producing the same; and a lithium ion secondary battery comprising the negative electrode for a lithium ion secondary battery.

The present inventors have found that the above object can be achieved by using a negative electrode for a lithium ion secondary battery comprising a negative electrode active material layer composed of a tin structure having a specific shape, and thus the present invention has been completed.

A first aspect of the present invention is directed to a negative electrode for a lithium ion secondary battery, comprising a current collector layer, and a negative electrode active material layer composed of a tin structure, wherein the tin structure includes a plurality of protrusions which protrude approximately perpendicularly to a main surface of the current collector layer, and a cross-sectional area of the tip portion parallel to the main surface of the current collector layer of the protrusion is smaller than that of the base end portion.

A second aspect of the present invention is directed to a lithium ion secondary battery comprising the negative electrode for a lithium ion secondary battery according to the present invention.

A third aspect of the present invention is directed to a method for producing a negative electrode for a lithium ion secondary battery, comprising a current collector layer, and a negative electrode active material layer composed of a tin structure, the method comprising the steps of forming a tin film on a surface of the current collector layer, and forming a tin film on a surface of the current collector layer, and pressing a mold against the tin film to form the tin structure including a plurality of protrusions which protrude approximately perpendicularly to a main surface of the current collector layer, wherein a cross-sectional area of the tip portion parallel to the main surface of the current collector layer of the protrusion is smaller than that of the base end portion.

According to the present invention, it is possible to provide a negative electrode for a lithium ion secondary battery, capable of obtaining a lithium ion secondary battery which is excellent in initial charge characteristics and is also excellent in charge/discharge cycle characteristics; a method for producing the same; and a lithium ion secondary battery comprising the negative electrode for a lithium ion secondary battery.

DETAILED DESCRIPTION OF THE INVENTION

Negative Electrode for Lithium Ion Secondary Battery

The negative electrode for a lithium ion secondary battery according to the present invention comprises at least a current collector layer and a tin structure as a negative electrode active material layer.

A known material can be used as the material of the current collector layer as long as it is a material having electric conductivity. Examples of the material include a metal sheet made of stainless steel, gold, platinum, nickel, aluminum, molybdenum or titanium; a metal foil, a wire net, a punching metal, an expand metal, or a net or nonwoven fabric composed of a metal-plated fiber, a metal-deposited wire and a metal-containing synthetic fiber. In particular, a copper foil is preferably used in view of adhesion and current collecting properties.

The tin structure includes a plurality of protrusions which protrude approximately perpendicularly to a main surface of the current collector layer, and a cross-sectional area of the tip portion parallel to the main surface of the current collector layer of the protrusion is smaller than that of the base end portion.

Figure 1:
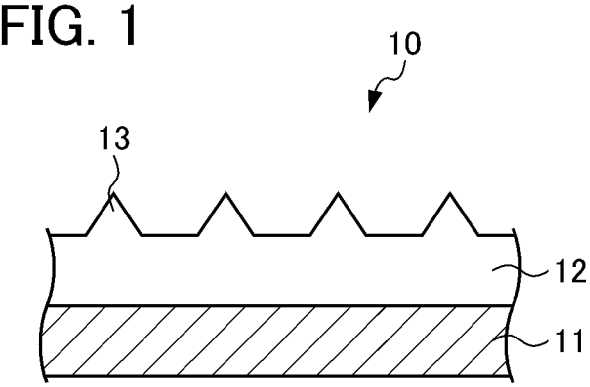
FIG. 1 is a schematic view showing an example of a negative electrode for a lithium ion secondary battery of the present invention.

FIG. 1 is a schematic view showing an example of a negative electrode for a lithium ion secondary battery of the present invention. A negative electrode 10 has a structure in which a tin structure 12 is provided on a surface of a current collector layer 11, and the tin structure includes a plurality of protrusions 13. In this case, the protrusion 13 has a triangular shape viewed from the side, and the base end portion has a maximum cross-sectional area, which is parallel to the main surface of the current collector layer 11, while the tip portion has a minimum cross-sectional area.

Figure 2A:
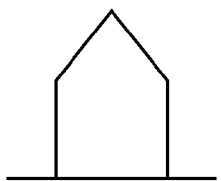
FIG. 2A is a view showing an example of a shape of a protrusion viewed from the side.
Figure 2B:
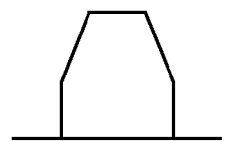
FIG. 2B is a view showing an example of a shape of a protrusion viewed from the side.
Figure 2C:
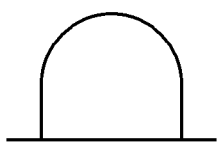
FIG. 2C is a view showing an example of a shape of a protrusion viewed from the side.
Figure 2D:
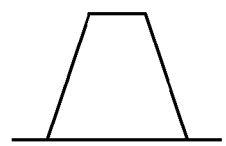
FIG. 2D is a view showing an example of a shape of a protrusion viewed from the side.
Figure 2E:
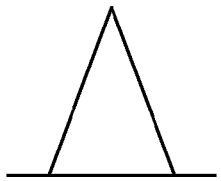
FIG. 2E is a view showing an example of a shape of a protrusion viewed from the side.

The shape of the protrusion is not particularly limited as long as a cross-sectional area of the tip portion is smaller than that of the base end portion. The shapes viewed from the side are shown in FIGS. 2A, 2B, 2C, 2D and 2E. FIG. 2A shows a shape including a portion where a cross-sectional area of the base end portion of the protrusion is retained, and a portion formed thereon where the cross-sectional area gradually decreases at a given ratio toward the tip portion, resulting in formation of a sharp tip. For example, it is a shape in which a cone is provided on a column. FIG. 2B shows a shape in which the tip in FIG. 2A is cut off in parallel to a main surface of a current collector layer, and a cross-sectional area of the tip portion is smaller than that of the base end portion. FIG. 2C shows a shape including a portion where a cross-sectional area of the base end portion of the protrusion is retained, and a portion formed thereon where the cross-sectional area slowly decreases toward the tip portion first and then quickly decreases. For example, it is a shape in which a bowl-shaped object is provided on a column. FIG. 2D shows a shape in which a cross-sectional area of the protrusion gradually decreases at a given ratio toward the tip portion from the base end portion; the shape having no sharp tip. FIG. 2E shows a shape in which a cross-sectional area of the protrusion gradually decreases at a given ratio toward the tip portion from the base end portion; the shape having a sharp tip. For example, it is a shape like a cone or polyhedral pyramid.

The protrusion preferably has a shape in which the cross-sectional area decreases with increasing distance from the current collector layer. The case of FIG. 2D or 2E corresponds to this. The protrusion more preferably has a conical shape or a polyhedral pyramidal shape. The case of FIG. 2E corresponds to this.

Since inclusion of the protrusion having such a shape enables an increase in a surface area of a negative electrode, it is possible to increase an initial charge rate in a lithium ion secondary battery using this negative electrode. In the lithium ion secondary battery using this negative electrode, since a cross-sectional area of the base end portion of the protrusion is larger than that of the tip portion, even if the tip portion of the protrusion undergoes significant volume expansion due to alloying upon charging alloying, it is possible to reduce the generation of cracking on the base end portion.

In the tin structure, the thickness from the main surface of the current collector layer to the tip portion of the protrusion is preferably from 1 to 60 µm, and more preferably from 1 to 20 µm, so as to ensure sufficient charge/discharge capacity. In the tin structure, the thickness from the main surface of the current collector layer to the base end portion of the protrusion varies depending on the thickness of the below-mentioned tin plated film, and is preferably smaller. The thickness is preferably 40 µm or less, more preferably 20 µm or less, still more preferably 5 µm or less, and particularly preferably 1 µm or less. The width of the base end portion of the protrusion is preferably from 1 to 30 µm, and more preferably from 2 to 15 µm. The surface area of the tin structure including the protrusion preferably accounts for 101 to 500%, more preferably 105 to 300%, and still more preferably 110 to 150%, of the flat surface area when the protrusion is not included.

The tin structure may be directly provided on the current collector layer, or may be provided on a metal layer provided on the current collector layer. The tin structure is provided on the current collector layer or the metal layer, and is therefore stably retained even in the case of repeating charging/discharging. A metal component used in the metal layer may be zinc, copper, nickel, silver, indium, antimony, bismuth, lead or an alloy containing these metals as a main component. Formation of the metal layer between a current collector layer and a tin structure enables suppression of deterioration of cycle characteristics due to expansion/shrinkage involved in occlusion/release of lithium.

In order to perform stress relaxation upon charging/discharging, a layer made of cadmium, indium, antimony or an alloy containing these metals as a main component may be formed on the tin structure. Formation of this layer enables suppression of deterioration of cycle characteristics due to expansion/shrinkage involved in occlusion/release of lithium.

Method for Producing Negative Electrode for Lithium Ion Secondary Battery

A method for producing a negative electrode for a lithium ion secondary battery according to the present invention comprises the steps of forming a tin film on a surface of the current collector layer, and pressing a mold against the tin film to form the tin structure including a plurality of protrusions which protrude approximately perpendicularly to a main surface of the current collector layer.

The step of forming a tin film on a surface of a current collector layer is preferably performed by electrolytic tin plating or electroless tin plating.

Known plating baths may be used as an electrolytic tin plating bath and an electroless tin plating bath.

It is possible to use, as a supply source of tin ions, any compound as long as it is a compound capable of generating divalent tin ions in water, and the compound does not exclude even a slightly soluble salt. Specific examples thereof include inorganic soluble salts such as stannous borofluoride, stannous sulfate, stannous oxide, stannous chloride, tin pyrophosphate, tin sulfamate and stannite; and organic soluble salts such as stannous organic sulfonate, stannous sulfosuccinate and stannous aliphatic carboxylate.

The tin plating bath may contain a complexing agent. Thus, complex ions are formed by the coordination with a basis metal (copper or copper alloy), thereby transferring an electrode potential of the basis metal to a negative direction, and thus enabling acceleration of a chemical substitution reaction with tin.

Specific examples thereof include thioureas such as thiourea, 1,3-dimethylthiourea, trimethylthiourea, diethylthiourea, N,N'-diisopropylthiourea, allylthiourea, acetylthiourea, ethylenethiourea, 1,3-diphenylthiourea, thiourea dioxide, thiosemicarbazide; and amines such as ethylenediamine tetraacetate (EDTA), ethylenediamine tetraacetate disodium salt (EDTA•2Na), hydroxyethylethylenediamine triacetate (HEDTA), diethylenetriamine pentaacetate (DTPA), triethylenetetramine hexaacetate (TTHA), ethylenediamine tetrapropionate, ethylenediamine tetramethylene phosphate, diethylenetriamine pentamethylene phosphate, nitrilotriacetate (NTA), iminodiacetate (IDA), iminodipropionate (IDP), aminotrimethylene phosphate, aminotrimethylene phosphate pentasodium salt, benzylamine, 2-naphthylamine, isobutylamine, isoamylamine, methylenediamine, ethylenediamine, tetramethylenediamine, pentamethylenediamine, hexamethylenediamine, diethylenetriamine, tetraethylenepentamine, pentaethylenehexamine, hexaethyleneheptamine, cinnamylamine and p-methoxycinnamylamine.

The tin plating bath may contain a complexing agent for stabilizing the bath. Thereby, tin ions can be allowed to stably exist in a plating bath.

Specific examples of the complexing agent include oxycarboxylic acids such as gluconic acid, citric acid, tartaric acid, glucoheptonic acid, malic acid, glycolic acid, lactic acid, trioxybutyric acid, ascorbic acid, tetraoxydecanoic acid, tartronic acid, glyceric acid, citramalic acid, leucic acid, mevalonic acid, pantoic acid, ricinoleic acid, ricinelaidic acid, cerebronic acid, quinic acid and shikimic acid; and saccharides such as erythrose.

To the tin plating bath, surfactants, smoothing agents and antioxidants may be further added.

The pH of the tin plating bath can be favorably adjusted by adding pH adjustors. Examples of the pH adjustor include various acids such as hydrochloric acid, sulfuric acid, oxalic acid, boric acids, phosphoric acids and pyrophosphoric acids; and various bases such as potassium hydroxide, sodium hydroxide, ammonia and amine.

When a tin film is formed by electrolytic tin plating, for example, a plating solution commercially available from Leybold Co., Ltd., Starter Kurumo tin plating bath, can be exemplified as an example. Electrolytic tin plating can be performed by immersing a current collector layer in a tin plating bath, followed by application of an electrical current. The temperature of the tin plating bath is preferably from 20 to 90° C., and the pH is preferably adjusted within a range from 1 to 12. The current density to be applied is preferably from 1 to 30 A/dm$^2$. The electroplating time may be appropriately set such that the thickness of the tin plated film falls within a range from 1 to 100 µm, and preferably from 2.5 to 50 µm.

When a tin film is formed by electroless tin plating, for example, a tin plating bath containing 0.02 M to 0.20 M of tin chloride, 0.02 M to 0.08 M of a reducing agent such as titanium trichloride, and 0.10 M to 0.50 M of a complexing agent such as trisodium citrate, ethylenediaminetetraacetic acid disodium salt (EDTA-2Na) or nitrilotriacetic acid (NTA) is exemplified as an example. The temperature of the tin plating bath is preferably from 45° C. to 70° C., and the pH is preferably from 6.5 to 8.5. An electroless tin plating treatment is preferably performed under a nitrogen atmosphere.

It is also possible to use, as the current collector layer, a current collector layer in which a metal layer made of zinc, copper, nickel, silver, indium, antimony, bismuth, lead, or an alloy containing these metals as a main component is provided in advance on a surface on which a tin film is to be formed. The metal layer can be provided on the current collector layer by electroplating or electroless plating. Before performing these plating treatments, a known pretreatment such as degreasing, pickling or activation treatment can be optionally performed. Hereinafter, an underlying layer of the tin film, such as a current collector layer is sometimes referred to as a substrate.

Then, a mold is pressed against a tin film on the substrate, thereby forming a tin structure including a plurality of protrusions which protrude approximately perpendicularly to a main surface of the current collector layer, a cross-sectional area of the tip portion parallel to the main surface of the current collector of the protrusion being smaller than that of the base end portion.

The thickness of the tin film on the substrate varies depending on the type of a tin structure to be formed and, before pressing a mold against the tin film, the thickness is preferably from 1 to 100 µm, and more preferably from 2.5 to 50 µm.

The mold is preferably pressed against the tin film on the substrate under the conditions of a pressing pressure of 0.5 to 2 Pa and a pressing time of 1 second to 24 hours. Regarding the temperature condition, pressing is usually performed at room temperature, and may be performed at 0 to 300° C. The shape of the mold is favorably transferred to the tin film by pressing under these conditions. Thereafter, the mold is peeled from the tin film on the substrate.

In this step, the shape of the protrusion of the tin structure can be changed by varying the shape of the mold. On the surface of the mold in contact with the tin film, there are plural recesses, which are approximately perpendicular to the surface of the mold, so as to form a pair of the protrusions. Such mold can be produced, for example, by patterning to a silicon wafer using a resist, followed by etching. According to the shape (depth, width, negative shape of protrusion) of the recess to be produced, type of an etching solution, concentration, etching treatment time and treatment temperature may be appropriately selected.

The production of a Si mold including square pyramidal recesses will be shown below as an example.

Figure 3A:
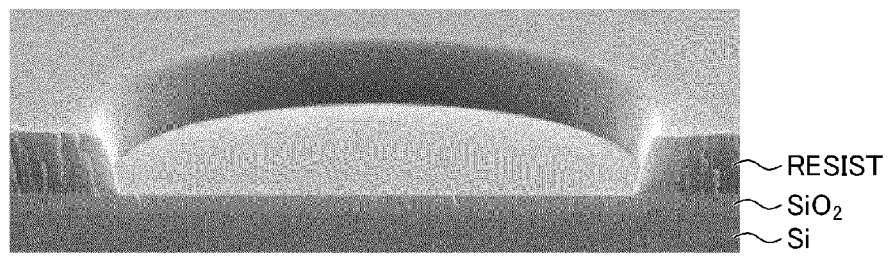
FIG. 3A is a view showing an example of a resist pattern formed on a Si substrate including a $SiO_2$ layer.
Figure 3B:
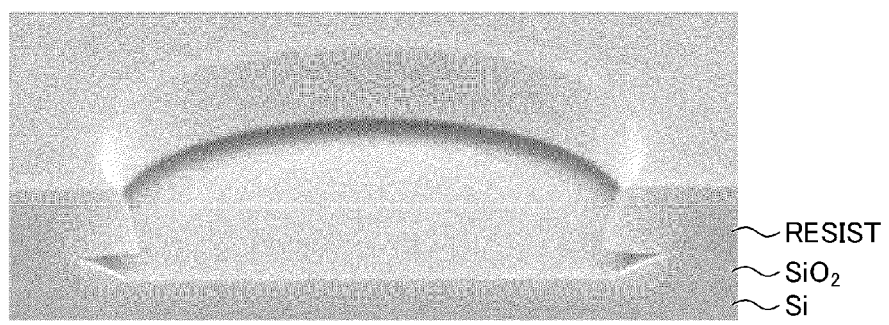
FIG. 3B is a view showing an example of a side-etched $SiO_2$ pattern.
Figure 3C:
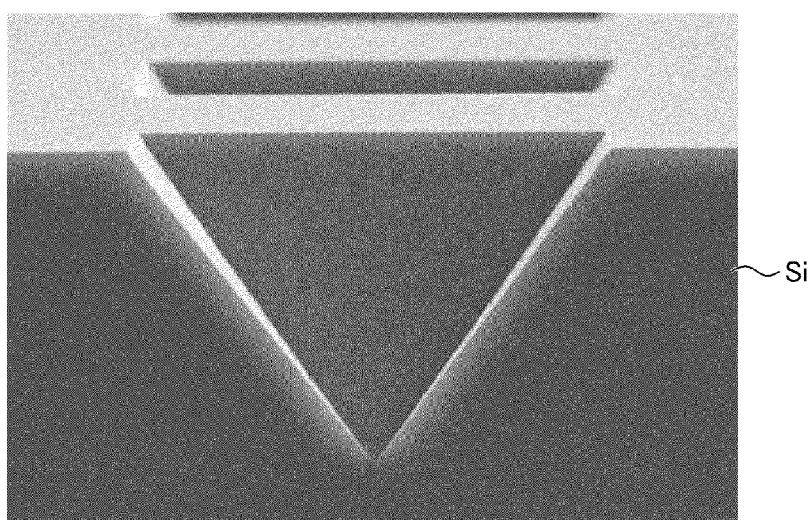
FIG. 3C is a view showing an example of a mold including a square pyramidal recess.

A resist pattern having a recess (hole) shape is formed to a Si substrate including a SiO$_2$ layer by conventional resist lithography (FIG. 3A). The width of the hole is not particularly limited, and is preferably from 0.5 to 20 μm, and more preferably from 1 to 15 μm. Then, the $SiO_2$ layer is etched through the resist pattern as a mask by a hydrofluoric acid based wet etching treatment to obtain a side-etched $SiO_2$ pattern (FIG. 3B). After optionally rinsing with pure water, a Si substrate is allowed to undergo wet etching with a strong alkaline through the resist pattern and the $SiO_2$ pattern as a mask to form a square pyramidal recess. At this time, the resist pattern of the mask is peeled together. Then, a rinsing treatment with pure water is optionally performed and the $SiO_2$ pattern of the mask is removed by the hydrofluoric acid based etching solution to obtain a mold including a square pyramidal recess (FIG. 3C). The width of the recess is preferably from 1 to 30 μm, and more preferably from 2 to 15 μm. The recess preferably has a depth of 1 to 20 μm. A rinsing treatment with alcohols or pure water is optionally performed, or an ultrasonic cleaning treatment is performed.

When the mold thus produced is pressed against a tin film, a tin structure including a plurality of square pyramidal protrusions can be formed.

Lithium Ion Secondary Battery

The lithium ion secondary battery according to the present invention includes at least a positive electrode, a separator, an electrolytic solution and the negative electrode.

Examples of the shape of the lithium ion secondary battery include, but are not limited to, cylindrical shape, a rectangular shape and a coin shape. The structure of the lithium ion secondary battery to be produced is not particularly limited. Basically, there is exemplified a structure in which a negative electrode is disposed on a cell floor plate, and an electrolytic solution and a separator are disposed thereon, and also a positive electrode is disposed thereon so as to face the negative electrode, followed by sealing together with a gasket and a sealing plate to obtain a secondary battery.

The positive electrode includes at least a current collector and a positive electrode active material.

It is possible to preferably use, as the positive electrode active material, a metal chalcogen compound capable of occluding/releasing lithium ions upon charging/discharging. Examples of the metal chalcogen compound include oxide of vanadium, sulfide of vanadium, oxide of molybdenum, sulfide of molybdenum, oxide of manganese, oxide of chromium, oxide of titanium, sulfide of titanium, and complex oxides and complex sulfides thereof. The metal chalcogen compound is preferably, $Cr_3O_8$, $V_2O_5$, $V_5O_{18}$, $VO_2$, $Cr_2O_5$, $MnO_2$, $TiO_2$, $MoV_2O_8$, $TiS_2V_2S_5MoS_2$, $MoS_3VS_2$, $Cr_{0.25}V_{0.75}S_2$ or $Cr_{0.5}V_{0.5}S_2$. It is also possible to preferably use $LiMY_2$ (M is transition metal such as Co or Ni, Y is a chalcogen atom such as O or S), $LiM_2Y_4$ (M is Mn, Y is O), oxide such as $WO_3$, sulfide such as CuS, $Fe_{0.25}V_{0.75}S_2$, or $Na_{0.1}CrS_2$, phosphorus such as $NiPS_8$ or $FePS_8$, a sulfur compound, and a selenium compound such as $VSe_2$ or $NbSe_3$.

A known current collector can be used as the current collector as long as it is a material having electric conductivity similar to a current collector for negative electrode, and it is possible to use a foil made of aluminum, stainless steel, nickel, titanium, or an alloy thereof, a punched metal, an expand metal and a net.

A pasty mixture prepared by mixing the positive electrode active material with a solvent and a binder is applied on the positive electrode current collector and then dried, and thus a positive electrode can be obtained. Examples of the binder used in the production include polyvinylidene fluoride (PVDF), polytetrafluoroethylene (PTFE), polyacrylic acid, a polyimide resin and a styrene butadiene rubber (SBR). N-methylpyrrolidone (NMP), acetone and water are used as the solvent.

The electrolytic solution includes a solution prepared by dissolving an electrolyte salt in a non-aqueous solvent.

It is possible to use, as the non-aqueous solvent, a cyclic carbonate solvent (propylene carbonate, ethylene carbonate, butylene carbonate), a chain carbonate solvent (dimethyl carbonate, diethyl carbonate, methylethyl carbonate, methylisopropyl carbonate), an amide solvent (N-methylformamide, N-ethylformamide, N,N-dimethylformamide, N-methylacetamide, N,N-dimethylacetamide, N-ethylacetamide, N-methylpyrrolidinone), a lactone solvent (γ-butyl lactone, γ-valerolactone, δ-valerolactone, 3-methyl-1,3-oxazolidin-2-one, etc.), alcohol solvents (ethylene glycol, propylene glycol, glycerin, methyl cellosolve, 1,2-butanediol, 1,3-butanediol, 1,4-butanediol, diglycerin, polyoxyalkylene glycol, cyclohexanediol, xylene glycol, etc.), an ether solvent (methylal, 1,2-dimethoxyethane, 1,2-diethoxyethane, 1-ethoxy-2-methoxyethane, alkoxypolyalkylene ether, etc.), a nitrile solvent (benzonitrile, acetonitrile, 3-methoxypropionitrile, etc.), 2-imidazolidinones (1,3-dimethyl-2-imidazolidinone, etc.), pyrrolidones, a sulfolane solvent (sulfolane, tetramethylenesulfolane), a furan solvent (tetrahydrofuran, 2-methyltetrahydrofuran, 2,5-dimethoxytetrahydrofuran), dioxolane, dioxane and dichloroethane alone, or a mixed solvent of two or more solvents. The non-aqueous solvent preferably contains chain carbonates such as dimethyl carbonate, diethyl carbonate, methylethyl carbonate and methylisopropyl carbonate, and more preferably contains cyclic carbonates such as ethylene carbonate, propylene carbonate and butylene carbonate.

It is possible to use, as an electrolyte salt, those which dissolve in a non-aqueous solvent to exhibit high ionic conductivity. Examples thereof include $LiPF_6$, $LiSbF_6$, $LiAsF_6$, $LiBF_4$, $LiClO_4$, LiI, LiBr and $LiAlCl_4$. An electrolytic solution may be prepared by dissolving about 0.5 to 2.0 M of the electrolyte in the non-aqueous solvent.

It is possible to use, as the separator, a separator which exhibits low resistance to ion movement of an electrolyte solution and is also excellent in retention of a solution. Examples of the separator include a glass fiber filter, a nonwoven fabric filter composed of a polymer fiber of polyester, Teflon (registered trademark), polyflon or polypropylene, and a nonwoven fabric filter using a glass fiber in combination with the polymer fiber. These separators can exhibit a function by impregnating with the electrolytic solution.

EXAMPLES

The present invention will be more specifically described below by way of Examples, but the present invention is not limited to the following Examples.

Production of Mold

A resist composition (OFPR-800LB: manufactured by TOKYO OHKA KOGYO CO., LTD.) was applied on an 8 inch $SiO_2$ wafer subjected to an HMDS treatment and prebaked at 110° C. for 90 seconds to form a 1.62 μm thick resist film.

Then, the resist film was exposed through a mask using an exposure system PLA501F (manufactured by Canon Inc.).

Furthermore, an alkali developing treatment was performed in an aqueous 2.38% by mass tetramethylammonium hydroxide solution "NMD-3" (trade name, manufactured by TOKYO OHKA KOGYO CO., LTD.) at 23° C. for 60 seconds, and then a post baking treatment was performed at 110° C. for 5 minutes to form a hole-type resist pattern.

Using a hydrofluoric acid based etching solution, a $SiO_2$ layer was etched for 8 minutes and then rinsed with pure water for 1 minute.

Using an aqueous strong alkali solution, an etching treatment of a Si layer was performed at 60° C. for 2 hours, followed by rinsing with pure water for 1 minute.

Using a hydrofluoric acid based etching solution, etching was performed for 10 minutes to remove a $SiO_2$ mask pattern, followed by ultrasonic cleaning for 5 minutes and further rinsing treatment with pure water for 1 minute.

A Si mold including a plurality of square pyramidal recesses was obtained by the above method. In the following Examples, the Si mold obtained by this method was used so as to form various tin structures.

Production of Negative Electrode

Comparative Example 1

Using a 18 μm thick electrolytic copper foil as a current collector, electrolytic tin plating was performed.

Tin Plating Conditions

| | |
|---|---|
| $K_4P_2O_7$ | 0.5 mol/l |
| $SnCl_2 \cdot 2H_2O$ | 0.175 mol/l |
| $C_6H_{11}NaO_7$ | 0.10 mol/l |
| pH | 9.0 |
| Temperature | 55° C. |
| Current density | 1.0 A/dm² |

Under the above conditions, electroplating was performed for 5 minutes to produce a sample electrode (1a) including a 10 μm thick tin plated film.

Example 1

The above Si mold was pressed against the sample electrode (1a) produced in Comparative Example 1 to produce a sample electrode (2a) comprising a tin structure including a plurality of square pyramidal protrusions.

Mold Pressing Conditions

| | |
|---|---|
| Pressing pressure | 2 Pa |
| Pressing time | 120 seconds |
| Temperature | 23° C. |

Figure 4:
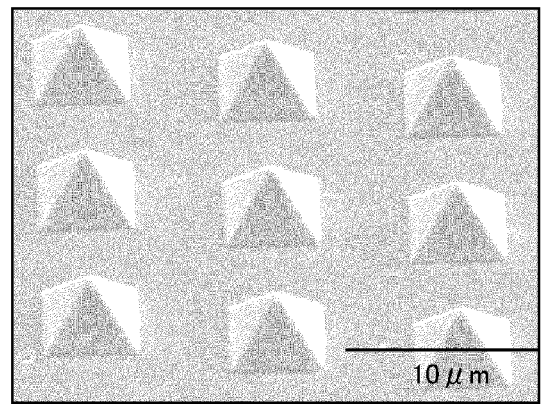
FIG. 4 is a view showing a surface shape of a tin structure of Example 1.

As shown FIG. 4, the protrusion of the tin structure has a square pyramidal shape in which the base end portion has a side of 5 μm and a height of 3.5 μm, a distance between adjacent protrusions was 5 μm. At this time, in the tin structure, a ratio of the sum total of cross-sectional areas of the base end portions of protrusions to that of the flat portions with no protrusion formed thereon was 50:50. The thickness from a main surface of a current collector layer to the base end portion of protrusions was 0.8 μm.

Production of Lithium Ion Secondary Battery and Evaluation of Initial Charge Characteristics Example 2

Using a 16 μm thick aluminum sheet as the current collector, a solution prepared by dispersing $LiCoO_2$, Ketjen black and PVDF in NMP in a ratio of 8:1:1 was applied in a thickness of 50 μm and then dried to produce a positive electrode (C1). The positive electrode (C1) and the sample electrode (2a) produced in Example 1 were respectively cut into a disk shape having a diameter of 14 mm. Under argon atmosphere, the positive electrode (C1) having a diameter of 14 mm and a separator having a diameter of 16 mm (Celgard #2400) were sequentially placed in a CR2032 coin cell, and then 150 μl of an electrolytic solution (solvent:ethylene carbonate:diethyl carbonate=1:1, electrolyte salt: 1 mol/l of $LiPF_6$) was added. A sample electrode (2a) having a diameter of 14 mm was placed as a negative electrode and a battery case was sealed to obtain a lithium ion secondary battery (B2). Using the thus obtained lithium ion secondary battery (B2), a potential change due to occlusion of lithium was measured by a charge/discharge measuring system (DS-8, manufactured by HOKUTO DENKO CORP.). The potential change was measured to 9,500 sec at a current density of 1 mA/dcm², a charge rate of 1.0 C and a voltage within a range from 2.5 to 4.2 V. The results are shown in FIG. 5.

Comparative Example 2

In the same manner as in Example 2, except that a sample electrode (1a) having a diameter of 14 mm was used as a negative electrode, a lithium ion secondary battery (B1) was obtained and then potential change due to occlusion of lithium was measured.

Figure 5:
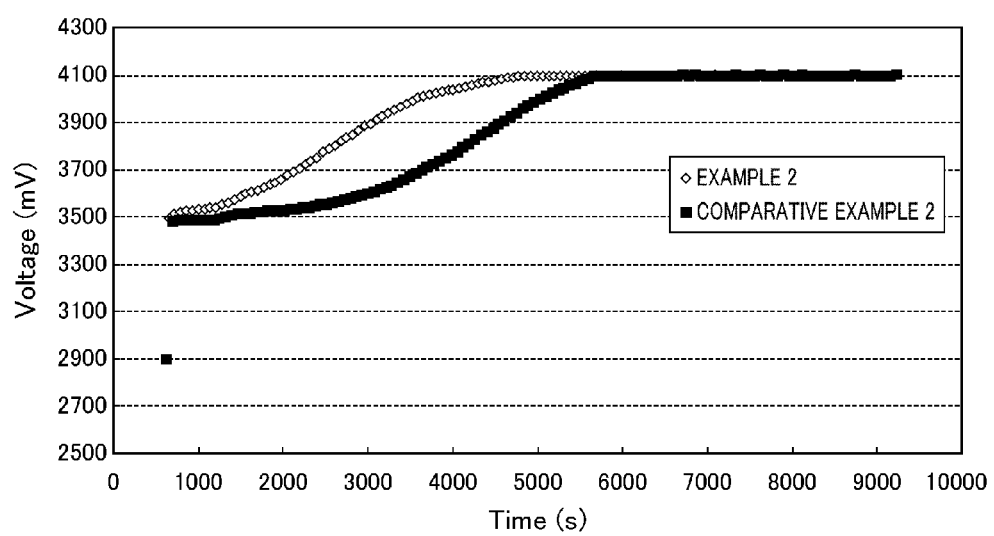
FIG. 5 is a graph showing initial charge characteristics of lithium ion secondary batteries of Example 2 and Comparative Example 2.

As is apparent from FIG. 5, a lithium ion secondary battery (B2) using a sample electrode (2a) as a negative electrode produced in Example 1 is a battery in which the potential quickly reaches 4.1 V, that is, lithium ions are quickly occluded, among lithium ion secondary batteries (B1) and (B2). As mentioned above, when using a negative electrode for a lithium ion secondary battery comprising a negative electrode active material layer composed of a tin structure, the tin structure including a plurality of protrusions which protrude approximately perpendicularly to a main surface of the current collector layer, a cross-sectional area of the tip portion parallel to the main surface of the current collector layer of the protrusion is smaller than that of the base end portion, a surface area of the negative electrode increases, and thus initial charge characteristics of the lithium ion secondary battery are improved.

Production of Lithium Ion Secondary Battery and Evaluation of Charge/Discharge Cycle Example 3

Under the plating conditions of Comparative Example 1, the electroplating time was set to 2 minutes to form a 6 μm thick tin plated film. The same Si mold as in Example 1 was pressed against the tin plated film to produce a sample electrode (3a).

Example 4

In the same manner as in Example 3, except that a Si mold with an extended distance between adjacent square pyramidal recesses was used, a sample electrode (4a) was produced in Example 3 such that a ratio of the sum total of cross-sectional areas of the base end portions of protrusions of the tin structure to that of the flat portions with no protrusion formed thereon becomes 38:62.

Example 5

In the same manner as in Example 3, except that the thickness of the tin plated film to be formed by electroplating is set to 9 μm, a sample electrode (5a) was produced.

Examples 6 to 8

The positive electrode (C1) produced in Example 2 and the sample electrodes (3a) to (5a) produced in Examples 3 to 5 were respectively cut into a square measuring 20 mm×20 mm. Under argon atmosphere, the positive electrode (C1) measuring 20 mm×20 mm and a separator measuring 20 mm×20 mm (Celgard #2400) were sequentially placed in a laminate cell, and then 150 μl of an electrolytic solution (solvent:ethylene carbonate:ethylmethyl carbonate:dimethyl carbonate=1:1:1, electrolyte salt: 1 mol/l of $LiPF_6$) was added. Sample electrodes (3a), (4a) or (5a) measuring 20 mm×20 mm was placed as a negative electrode and a battery case was sealed to obtain lithium ion secondary batteries (B3) to (B5).

Using the thus obtained lithium ion secondary battery (B3), (B4) or (B5), a charge/discharge cycle test was performed at a charge rate of 0.2 C, a voltage within a range from 2.5 to 4.2 V and a temperature of 20° C. by a charge/discharge measuring system (DS-8, manufactured by HOKUTO DENKO CORP.). Magnitude of the discharge capacity was as follows: (B5)>(B3)>(B4). As the tin plated film becomes thicker and as the number of protrusions and the surface area become larger, the discharge capacity increased. It could be confirmed that all lithium ion secondary batteries (B3), (B4) and (B5) maintain 50% of the capacity after 100 cycles. Even after 100 cycles, cracking did not occur on a surface of a negative electrode.

Explanation of Reference Numerals

10 Negative electrode
11 Current collector layer
12 Tin structure
13 Protrusion

What is claimed is:

1. A negative electrode for a lithium ion secondary battery, comprising a current collector layer and a negative electrode active material layer, wherein the negative electrode active layer comprises a structure consisting of tin, which includes a plurality of protrusions that protrude approximately perpendicularly to a main surface of the current collector layer, and wherein
cross-sectional area of the plurality of protrusions comprises a tip portion parallel to a main surface of the current collector layer and a base end portion wherein the tip portion is smaller than the base end portion.

2. The negative electrode for a lithium ion secondary battery according to claim 1, wherein the cross-sectional area decreases with increasing distance from the current collector layer.

3. A lithium ion secondary battery comprising the negative electrode for a lithium ion secondary battery according to claim 1.

4. The negative electrode for a lithium ion secondary battery according to claim 1, wherein the plurality of protrusions are shaped like a cone or polyhedral pyramid.

5. The negative electrode for a lithium ion secondary battery according to claim 1, wherein a thickness from the main surface of the current collector layer to the tip portion of the plurality of protrusions is from 1 to 60 μm.

6. The negative electrode for a lithium ion secondary battery according to claim 1, wherein a thickness from the main surface of the current collector layer to the base end portion is 40 μm or less.

7. The negative electrode for a lithium ion secondary battery according to claim 1, wherein a width of the base end portion of the plurality of protrusions is from 1 to 30 μm.

* * * * *